United States Patent
Kesselmayer et al.

(10) Patent No.: US 6,586,516 B1
(45) Date of Patent: *Jul. 1, 2003

(54) AQUEOUS COATING COMPOSITIONS

(75) Inventors: Mark Alan Kesselmayer, Harleysville, PA (US); Theodore Tysak, Philadelphia, PA (US); Matthew Stewart Gebhard, New Britain, PA (US); Min-Chi Tsai von Trentini, Yardley, PA (US)

(73) Assignee: Rohm and Haas Company, Philadelphia, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/720,793

(22) Filed: Oct. 4, 1996

Related U.S. Application Data

(60) Provisional application No. 60/004,831, filed on Oct. 5, 1995.

(51) Int. Cl.[7] .................................................. C08K 5/01
(52) U.S. Cl. .................... 524/475; 427/385.5; 427/393; 428/463; 428/484; 428/485; 428/514; 524/477; 524/522; 524/523; 524/558
(58) Field of Search ................................. 524/558, 522, 524/523, 475, 477; 427/385.5, 393; 428/463, 484, 485, 514

(56) References Cited

U.S. PATENT DOCUMENTS

| | | | | |
|---|---|---|---|---|
| 3,328,325 A | * | 6/1967 | Zdanowski | 260/22 |
| 3,467,610 A | * | 9/1969 | Fiarman et al. | 260/22 |
| 3,607,834 A | * | 9/1971 | Marx et al. | 526/313 X |
| 4,855,349 A | * | 8/1989 | Ingle | 524/432 |
| 4,987,186 A | * | 1/1991 | Akiyama et al. | 525/107 |
| 5,055,511 A | * | 10/1991 | Ingle | 524/406 |
| 5,149,745 A | * | 9/1992 | Owens et al. | 525/366 |
| 5,270,376 A | | 12/1993 | Matejcek et al. | 524/501 |
| 5,319,018 A | * | 6/1994 | Owens et al. | 524/556 |
| 5,349,026 A | * | 9/1994 | Emmons et al. | 525/328.6 |
| 5,428,107 A | * | 6/1995 | Tysak et al. | 525/402 |
| 5,541,265 A | | 7/1996 | Gomi et al. | 525/366 |
| 5,559,192 A | * | 9/1996 | Bors et al. | 525/300 |

FOREIGN PATENT DOCUMENTS

| WO | WO 91/027593 | 3/1991 |
|---|---|---|
| WO | WO 95/09208 | 4/1995 |

* cited by examiner

*Primary Examiner*—Judy M. Reddick
(74) *Attorney, Agent, or Firm*—Stephen E. Johnson; Kevin F. Gironda; Ronald D. Bakule

(57) ABSTRACT

The present invention relates to an aqueous coating composition having low volatile organic compounds (VOC) and producing a coating having excellent durability and resistance properties. The coating composition contains acetoacetate functional polymer and divalent metal ions. Coating compositions of the present invention are particularly useful in ink, polish and coating compositions where a tough, resistant coating is required. The coating composition can be used on various substrates such as floors, walls wood, metal, plastic, stone, paper, leather and concrete.

7 Claims, No Drawings

AQUEOUS COATING COMPOSITIONS

This is a nonprovisional application of prior pending provisional application Ser. No. 60/004,831, filed Oct. 5, 1995.

The present invention relates to aqueous coating compositions. In particular, the aqueous coating compositions of the present invention have a low level of volatile organic compounds ("VOC") and provide dry films having excellent resistance properties and durability. Aqueous coating compositions of the present invention are useful in polish and coating applications where durability and resistance properties are important.

Various methods have previously been employed to prepare durable, resistant aqueous coating compositions. One approach has been to prepare zinc-complexed polymers. Another approach uses polymers having a glass transition temperature ("Tg") above ambient temperature in conjunction with volatile organic coalescents to aid in film formation. Higher Tg polymers provide better durability and resistance properties, but also require higher levels of VOC. Unfortunately, coating compositions having either zinc or high levels of VOC present regulatory and environmental concerns.

One attempt to overcome the problems associated in preparing a durable, environmentally friendly coating with good resistance properties is disclosed in U.S. Pat. No. 5,428,107. The disclosed coating composition contains a polymer having acetoacetate groups and acid-functional monomer. The polymer is post-treated with amino-functional silane. In one embodiment of U.S. Pat. No. 5,428,107, the acid-functionality on the polymer can be further reacted with divalent metal ions. While this composition can be used to produce durable, zinc-free coatings, it still contains relatively high levels of VOC. Additionally, coating compositions containing amino-functional silane are more expensive than conventional coatings.

The present invention has overcome the environmental problems associated with zinc and high VOC, in the absence of expensive amino-functional silanes. We have found that durable, resistant coatings can be formed from aqueous compositions having VOC levels below seven percent by formulating an acetoacetate-functional polymer with selected metal ions. The coating compositions of the present invention can be used to produce tough, resistant coatings on various substrates such as floors, walls, wood, metal, plastic, stone, paper, leather and concrete.

In a first aspect of the present invention, there is provided a coating composition comprising:
 a) polymer comprising, as polymerized units, from 0.5 percent to 100 percent by weight acetoacetate-functional monomer; wherein the polymer has a glass transition temperature in the range of from −20° C. to 150° C.; and
 b) divalent metal ion;
wherein the molar ratio of acetoacetate-functional monomer to divalent metal ion is in the range of from 20:1 to 2:1; wherein the composition is substantially free of sulfopolyester; and wherein the composition is substantially free of amino-functional silane.

In a second aspect of the present invention, there is provided a process comprising:
 a) forming a coating composition by admixing:
  1) polymer comprising, as polymerized units, from 0.5 to 100 percent acetoacetate-functional monomer; wherein the polymer has a glass transition temperature in the range of from −20° C. to 150° C.; and
  2) divalent metal ion;
 wherein the molar ratio of acetoacetate-functional monomer to divalent metal ion is in the range of from 20:1 to 2:1; wherein the composition is substantially free of sulfopolyester; and wherein the composition is substantially free of amino-functional silane;
 b) applying said coating composition to a substrate to form a coated substrate; and
 c) drying said coated substrate.

In a third aspect of the present invention, there is provided a coating composition comprising:
 a) polymer comprising, as polymerized units, from 0.5 percent to 100 percent by weight acetoacetate-functional monomer; wherein said polymer has a glass transition temperature in the range of from −20° C. to 150° C.; and wherein said polymer comprises less than 5 percent by weight acid-functional monomer;
 b) divalent metal ion; and
 c) amino-functional silane;
wherein the molar ratio of acetoacetate-functional monomer to divalent metal ion is in the range of from 20:1 to 2:1; and wherein the molar ratio of acetoacetate functional monomer to amino-functional silane is in the range of from 20:1 to 2:1.

In a fourth aspect of the present invention, there is provided an article comprising a substrate coated with the aqueous coating composition of the present invention.

Polymers

Polymers useful in the present invention have, as polymerized units, acetoacetate-functional monomer. These polymers can be homopolymers, copolymers or mixtures of such polymers. Suitable acetoacetate-functional monomers include acetoacetoxyethyl acrylate, acetoacetoxypropyl methacrylate, acetoacetoxyethyl methacrylate, allyl acetoacetate, acetoacetoxybutyl methacrylate, and 2,3-di (acetoacetoxy)propyl methacrylate. A preferred monomer is acetoacetoxyethyl methacrylate ("AAEM").

The acetoacetate-functional polymer may contain from 0.5 percent to 100 percent by weight of the acetoacetate-functional monomer. The amount of acetoacetate-functional monomer required will vary depending upon the end-use application. Generally, the acetoacetate-functional monomer level will be between 1 percent and 75 percent by weight. Conventional floor polish and coatings polymers will usually contain from 0.5 percent to 50 percent by weight acetoacetate-functional monomer. Polymers having a molecular weight of from 1,000 to over one million are useful in the present invention. In general, lower molecular weight polymers will have higher relative levels of acetoacetate-functional monomer. For example, a copolymer having a molecular weight under 10,000 would typically contain 30 percent or more of acetoacetate-functional monomer.

The polymers of this invention are most often copolymers of the acetoacetate-functional monomer and other monomers. As used herein, "(meth)acrylate" is used to mean either acrylate or methacrylate. Examples of useful comonomers include simple olefins such as ethylene, alkyl (meth) acrylates where the alkyl group has 1 to 20 carbon atoms (preferably 1 to 12 carbon atoms), vinyl acetate, acrylonitrile, styrene, isobornyl methacrylate, acrylamide, hydroxyethyl (meth)acrylate, hydroxypropyl (meth) acrylate, N-vinyl pyrolidinone, butadiene, isoprene, vinyl halides such as vinyl chloride and vinylidene chloride, alkyl maleates, and alkyl fumarates.

In a preferred embodiment of the present invention, the polymer also contains, as polymerized units, acid-functional monomers or salts thereof Suitable acid-functional monomers include, for example, carboxylic acid monomers, sodium vinyl sulfonate, sodium methallyl sulfonate, phosphoethylmethacrylate, or 2-acrylamido-2-methylpropanesulfonic acid. Preferably, the acid-functional monomer is a carboxylic acid monomer such as, for example, acrylic acid, methacrylic acid, fumaric acid, maleic acid, and itaconic acid. Acid-functional monomers are incorporated at a level sufficient to provide removability of a dried film formed from the composition. The acid-functional monomer level is preferably greater than 3 percent and more preferably from 5 to 75 percent by weight of the polymer. Most preferably, the acid-functional monomer level is in the range of from 8 percent to 50 percent by weight of the polymer, to provide detergent resistance and water resistance to the dried coating. If too much acid-functional monomer is incorporated into the polymer, the resistance of the film to scrubbing with alkaline detergent solutions and resistance to aqueous solutions are greatly compromised.

Also, acetoacetate-functional polymers having no acid-functional monomer are useful in the present invention. When used in the composition of the present invention, such polymers produce durable, resistant coatings useful in applications that do not require film removal, such as those used to seal floors and furniture.

In another embodiment of the invention, where the level of acid-functional monomer in the acetoacetate-functional polymer is below five percent by weight of the polymer, the polymer may be reacted with amino-functional silane. The amino-functional silane is added by post reaction of an effective amount of aminosilane with the acetoacetate-functional monomer in the polymer.

In another embodiment, polymers of this invention may be designed to swell in the presence of acidic stripper solutions, providing a mode for removability of the dried film from surfaces such as, for example, floors. Removability can be achieved by incorporating amino-functional monomer into the polymers useful in this invention. The polymers preferably contain from 3% to 30% amino-functional monomer, based on the total weight of monomers. More preferably, the amount of amino-functional monomer is from about 5% to about 20%, based on the total weight of monomers. Examples of amino-functional monomers are dimethylaminoethyl (meth)acrylate, t-butylaminoethyl (meth)acrylate, methylaminoethylacrylate, and mixtures thereof.

It is also possible, and sometimes desirable, to include low levels of divinyl or polyvinyl monomers such as glycol polyacrylates, allyl methacrylate, and divinyl benzene, to introduce a controlled amount of crosslinking in the polymer. Additionally, one may wish to include conventional chain transfer agents to control molecular weight of the polymer, such as, for example, a mercaptan.

Generally, polymers useful in the present invention are prepared by means known in the art such as dispersion or emulsion polymerization in water. Preferably, the polymer is prepared by aqueous emulsion polymerization using a suitable free radical initiator and appropriate heating. Conventional dispersants may be used at levels in the range of from 0.1 percent to 6 percent by weight based on the weight of total monomer. Initiation can be either by thermal or redox initiation using conventional free radical initiators such as, for example, hydrogen peroxide, organic hydroperoxides, organic peroxides and inorganic peroxides at levels of from 0.05 percent to 3.0 percent by weight based on the weight of total monomer.

The invention may also be practiced using a water-soluble polymer. Water-soluble polymers are advantageously used as blends with conventional latex polymers, preferably those containing acetoacetate functional monomers. The blend of alkali-soluble resin and latex polymer has a particularly advantageous property combination of gloss and rheology and is useful in coatings and printing ink applications.

In another aspect of the present invention, the polymer is prepared by a multistaged emulsion addition polymerization process, in which at least two stages differing in composition are formed in sequential fashion. Such a process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the appearance of the phases, for example, is such a technique. Two phase polymers are particularly useful in coating compositions where faster solvent release is desired. The use of two phase polymers in a coating composition also allows for the use of lower levels of VOC.

The coating composition of the present invention is generally film-forming. "Film-forming", as used herein, means that the coating composition has a minimum Film Forming Temperature ("MFFT") at, or below, the ambient temperature, to allow for fusion of the polymer into a continuous film. Volatile organic compounds, such as coalescents, can be used to temporarily lower the MFFT of a coating composition, allowing the polymer to form a film at a temperature below the Tg of that polymer. By "volatile organic compounds" or "VOC", as used herein, is meant organic compounds having a boiling point at atmospheric pressure of less than 250° C. Polymers of the present invention have a Tg in the range of from −20° C. to 150° C. and preferably from 0° C. to 150° C. If soluble polymers are used in the film-formation process, polymers of higher glass transition temperature are readily used since they are film-forming.

Polymers containing acetoacetate-functional monomers are prone to hydrolysis in water, particularly on heat aging. The hydrolysis occurs at nearly any pH and yields acetoacetic acid. This problem may be overcome by treating the acetoacetate-functional polymer with one molar equivalent of ammonia or a primary amine to form the enamine. The enamine is typically stable to hydrolysis at pH's typically greater than 7.

Divalent Metal Compounds

The coating composition of the present invention contains divalent metal ion in addition to the acetoacetate-functional polymer. Divalent metal ions useful in this invention include, for example, zinc, calcium, magnesium, zirconium and mixtures thereof. Preferably, the coating composition is free of zinc. More preferably, the divalent metal ion used in this invention is an alkaline earth metal ion. Calcium, magnesium, or mixtures thereof, are particularly preferred. Coating compositions having alkaline earth metal ion provide a harder coating surface than compositions containing zinc. Thus, a lower Tg polymer may be used with alkaline earth metal ion, resulting in a lower use level of VOC coalescent in the coating composition. "Low VOC", as used herein, means a total level of volatile organic compounds in the coating composition of less than 15%, preferably less than 9%, and most preferably less than 5% by weight based on the total coating composition.

Divalent metal ion modified polymers of this invention are prepared by adding to the coating composition an effective amount of divalent metal ion capable of reacting with the acetoacetate-functional polymer. The level of divalent metal ion is a function of the acetoacetate-functional monomer content of the polymer. Divalent metal ion levels useful in this invention are in the range of from 0.05 to 0.5 moles of divalent metal ion for each mole of acetoacetate functional monomer. This provides a molar ratio of acetoacetate-functional monomer to divalent metal ion in the range of from 20:1 to 2:1. In terms of equivalents, this is the same as two equivalents of acetoacetate-functional monomer to 0.05 to 0.5 equivalents of metal ion, or a ratio of equivalents of acetoacetate-functional monomer to divalent metal ion in the range of from 10:1 to 1:1. Preferably, the molar ratio of acetoacetate-functional monomer to divalent metal ion is in the range of from 10:1 to 2:1. In one embodiment of the present invention, the polymer may also contain acid-functional monomer. Since divalent metal ion can crosslink with both the acetoacetate-functional monomer and acid-functional monomer in the polymer, the useful level of divalent metal ion is a function of the sum of the acetoacetate-functional monomer and the acid-functional monomer.

If insufficient divalent metal ion is used in relation to the acetoacetate-functional polymer, properties such as, for example, black heel and scuff mark resistance, and mar resistance, of the dried coating may be compromised. Whereas, on the other hand, if more than 0.5 mole of divalent metal ion are used for each mole of acetoacetate-functional monomer, coating properties may become impaired.

The divalent metal ion is preferably introduced as a metal oxide, tetra-amino metal bicarbonate complex, a metal complex of an —NH— or $NH_2$— functional compound or a metal salt. Preferably, hydroxides of an alkaline earth metal ion are used, such as, for example, calcium hydroxide and magnesium hydroxide.

Divalent metal ion modified coating compositions of the present invention are prepared by adding a specific quantity of divalent metal ion to the acetoacetate-functional polymer. The quantity of divalent metal ion added should be in specific proportion, for reasons stated earlier, to the acetoacetate-functional monomer content of the polymer, or, where applicable, the acetoacetate-functional monomer content plus acid-functional monomer of the polymer. The divalent metal ion is preferably added to the coating composition after the polymerization of the polymer. The preferred coating composition is a single package, stable composition.

In general, the divalent metal ion can be added directly to the acetoacetate-functional polymer. However, for optimum performance, processing of the final divalent metal ion modified polymer and shelf-life stability, an auxiliary surfactant may be required. This is particularly true in cases where the polymer is produced by emulsion polymerization. The auxiliary surfactant can be added before or after the addition of the divalent metal ion.

Surfactants may be characterized by their "Hydrophilic-Lipophilic Balance" ("HLB") value. Surfactants with HLB values of less than 10 are considered to possess more lipophilic character, while surfactants with HLB values greater than 10 are considered to possess more hydrophilic character. The preferred surfactants of this invention are non-ionic surfactants having HLB values greater than 10. More preferably, the HLB value is greater than 15.

Surfactant levels from 0 up to 10 percent by weight of the polymer can be used. The preferable level of surfactant is between 3 percent and 6 percent of the weight of the polymer. Surfactants useful in the practice of the present invention are, for example, non-ionic surfactants, such as octylphenoxypolyethoxyethanols, nonylphenoxypolyethoxyethanols, polypropyloxyethoxy alcohols, and ionic surfactants such as sodium lauryl sulfate and sodium stearate.

Additives

The coating composition of this invention containing an acetoacetate-functional polymer modified with divalent metal ion may be formulated for the chosen coating end use. Additives such as thickeners, dispersants, pigment, extenders, fillers, anti-freeze agents, plasticizers, adhesion promoters, coalescents, wetting agents, defoamers, colorants, biocides, soaps and slip agents may be optionally added to the composition.

Application

The present invention provides for coating compositions that can be used to generate surface coatings for a variety of vertical and horizontal surfaces. More particularly, coating compositions of the present invention are useful as polishes, inks and other coatings. Dried films formed from the coating compositions exhibit improved properties such as black heel and scuff mark resistance, print resistance, mar resistance, block resistance, and impact resistance.

Substrates to which the coating composition of this invention may be applied include, for example, architectural substrates such as resilient and non-resilient floors, walls, marble, stone, terrazzo, concrete, asphalt, roofing substrates, linoleum; and industrial materials such as wood, particle board, medium density fiber board (MDF), metal, ceramics, leather, plastic, glass, paper, cardboard, kitchen cabinets and counter tops, and furniture products. Preferred substrates include furniture, flooring and paper. The coating composition of this invention may be applied to a substrate by methods well known in the art of applying coatings such as, for example, spray, brush, mop, roller and direct and reverse roll coating.

In some applications of this invention, the coated substrate is cured by heating up to 100° C. Preferably, the coating composition of this invention is cured at ambient conditions of temperature, relative humidity and air velocity, the temperature being greater than 0° C., in that the composition is formulated in an aqueous composition, and less than 40° C.

TEST METHODS

Mar Resistance

This test is based on striking the coating at a shallow angle with a hard object. In the examples provided, the object was the fingernail of the individual performing the test. This test gives an indication of how the coating will resist marring, which leads to gloss reduction of the coating.

Two different procedures for preparing samples to be used in the mar resistance test are embodied in the following Examples. In Examples 1–20 and 25–32, a 1 mil (0.025 millimeter) thick film of the coating composition was drawn down on an vinyl composition tile and cured at ambient temperature for 24 hours. In Examples 21–24, an 8 mil (0.2 millimeter) thick film of the coating composition was drawn down on an aluminum panel and cured in a 65° C. oven for 10 minutes, then removed and allowed to cool at ambient temperature and humidity for seven days. The cured samples formed by either procedure were then struck several times across the coating surface with the operator's fingernail. The operator's fingernail was kept parallel to the coated surface, and the impact angle was greater than 45 degrees from the normal of the surface, to increase the likelihood of marking the coating.

When comparing coatings, it is important that the same operator perform the test. This test is designed to distinguish relative differences.

The degree of damage to the coating surface was rated on a scale of from 1 to 5, as follows:
1=Coating can't be visibly scratched
2=Very slight scratch, visible at only at a few angles
3=Slight scratch, visible at any angle
4=Very visible scratch
5=Coating is easily torn

Black Heel Mark and Scuff Resistance

The method for determining black heel and scuff resistance is described in Chemical Specialty Manufacturers Association Bulletin No. 9–73, except that commercially available rubber shoe heels were used in place of the recommended 2 inch (5.08 centimeter) rubber cubes.

Furthermore, instead of subjectively rating the coated substrate, we determined the number of marks per square inch (6.45 square centimeters) of the coated substrate area which was covered by black heel and scuff marks. Black heel marks are an actual deposition of rubber onto or into the coating.

A scuff mark, on the other hand, results from a physical displacement of the coating and appears as an area of reduced gloss. Scuff and black heel marks can occur simultaneously at the point where the heel impacts the substrate i.e., upon removal of a black heel mark, a scuff may be present.

Measurement of Stackability

Stackability is a measure of the block resistance of a coating. A 2 inch (5.08 centimeter) wide, 8 mil (0.2 millimeter) thick film of the coating composition was drawn down on two panels of pine veneer plywood which had been spray-coated with sealer. The panels were cured in a 65° C. oven for 10 minutes then removed and allowed to cool for 5 minutes to approximately 30° C. The panels were stacked crosswise, face-to-face and a 5 kilogram weight placed on top of the panels. The panels with weight were allowed to stand overnight, about eighteen hours, at ambient temperature. The weight was removed, and the panels were rated on the following scale based on ease of separation:
1=panels are glued together
2=panels are difficult to take apart
3=panels are relatively easy to take apart
4=panels are very easy to take apart
5=panel fall apart

VOC

The level of volatile organic compounds reported is a percentage by weight of organic coalescent that was added to the coating composition.

Glass Transition Temperature (Tg)

All polymer Tg values in these examples were measured by differential scanning calorimetry (DSC), used at a rate of heating of 10° C. per minute with the Tg taken at the midpoint of the transition.

EXAMPLES

All Examples below were done on formulated coating compositions. The formulation of the emulsion polymers of this invention was done in the manner common and well understood to those in the art. The ingredients used, and their proportions and manner of addition are the same as is commonly practiced.

Example 1 (Comparative)

Examples 1–3 show the improvement in durability and resistance of coatings when calcium at several different levels is added to a coating composition containing acetoacetate-functional polymer. The coating composition of Example 1 contains acetoacetate functional polymer but no divalent metal.

Preparation of Latex Polymer 1009 g of DI water and 21.2 g of an ammonium salt of sulfated polyethoxynonylphenol (Rhodapex® CO-436, Rhone-Poulenc, Inc.), was charged to a kettle and heated to 85° C. A monomer emulsion mixture of 1.06 g Rhodapex® CO-436, 0.24 g sodium lauryl sulfate, 35.38 g of butyl acrylate, 17.15 g of methylmethacrylate, 9.23 g methacrylic acid and 43.93 g of water was then added to the kettle, followed by 4.25 g of sodium persulfate in 20 grams of water and five minutes later by 4.15 g of sodium carbonate in 61 g of water. After a five minute hold, a monomer emulsion mixture of 22.14 g Rhodapex® CO-436, 5.07 g sodium lauryl sulfate, 737.92 g of butyl acrylate (BA), 336.2 g acetoacetoxy ethyl methacrylate (AAEM), 370.41 g of methylmethacrylate (MMA), 192.47 g methacrylic acid (MAA) and 916.07 g of water was gradually added over ninety minutes at about 85° C. Fifteen minutes after the feeds were complete, the kettle was cooled to 60° C. and chased by adding 1.68 g of 0.1% iron (II) sulfate, 1.68 g of 1% tetra sodium salt of ethylenediamine tetra acetic acid, 1.58 g of 70% t-butyl hydroperoxide dissolved in 10 g of water and 0.77 g of isoascorbic acid dissolved in 15.1 g of water. A second chase, fifteen minutes later, consisted of 1.58 g of 70% t-butyl hydroperoxide dissolved in 10 g of water and 0.77 g of isoascorbic acid dissolved in 15.1 g of water. After cooling, the latex was diluted with 55 g of water. The latex contained a polymer of 46 BA/22 MMA/20 AAEM/12 MAA with a measured Tg of 22° C. Water was then added to provide a solids level of 38 percent.

Formulation of Aqueous Coating Composition

The following formulation was used for coating compositions of Examples 1–19 and 25–32. The amount of water was adjusted to maintain a solids level of 23.8% and compensate for differences in the solids content of each latex and the level of coalescent. The materials are listed in order of addition.

| Material | Function | Amount (parts by weight) |
| --- | --- | --- |
| Water | diluent | 34.71 |
| FC-120 (1%) (3M Company) | wetting agent | 1.02 |
| Kathon CG/ICP (1.5%) (Rohm and Haas Co.) | biocide | 0.03 |
| SWS-211 (Wacker Silicones Corp.) | defoamer | 0.02 |
| Diethylene Glycol Ethyl Ether (Dow | coalescent | 4.0 |

-continued

| Material | Function | Amount (parts by weight) |
|---|---|---|
| Chemical) Tributoxy Ethyl Phosphate (FMC Corp.) | leveling aid | 1.53 |
| Latex Polymer (38%) | vehicle | 52.73 |
| AC-325N (35%) (Eastman Chemical) | polyethylene wax emulsion | 3.18 |
| E-43N (40%) (Eastman Chemical) | polypropylene wax emulsion | 2.78 |
| Formulation Constants: | | |
| Polymer/Wax Ratio | | 90/10 |
| Nominal Solids | | 23.8% |

The coating composition of Example 1, having 4% coalescent (VOC), was tested for durability and resistance properties. The results are shown in Table V.

Example 2

The coating composition of Example 2 contains 0.5 equivalents of calcium. All levels of divalent metal ions in these examples are based on equivalents of divalent metal ion for each equivalent of acetoacetate functionality. A polymer latex was prepared with the same composition and procedure as described in Example 1. The calcium was added as a divalent metal ion in the following manner:

Preparation of Divalent Metal Latex:

800 g of the latex in Example 1 was added to a 1-liter kettle and heated to 50° C. To the heated latex was added 32 grams of polyoxyethylene (23) lauryl ether (Brij-35 (25%), ICI Americas, Inc.). A slurry of 5.84 g of calcium hydroxide in 10.6 g of DI water and two 5 gram rinses were added to the kettle and stirred for 30 minutes at 50° C. The latex was then cooled and filtered, producing a latex modified with 0.5 equivalents of calcium. This post-treated latex was formulated into the coating composition as described in Example 1. The coating composition of Example 2 was then tested for durability and resistance properties. The results are shown in Table V.

Example 3

The composition of Example 3 contains 1.0 equivalent of calcium. A polymer latex was prepared with the same composition and procedure as described in Example 1. 11.68 g of calcium hydroxide in a slurry was added to 800 g of the latex by the procedure described in Example 2. This post-treated latex was formulated into a coating composition as described in Example 1. The coating composition of Example 3 was tested for durability and resistance properties. The results are shown in Table V.

Example 4

The coating composition of Example 4 demonstrates the invention using magnesium as the divalent metal ion. A polymer latex was prepared with the same composition and procedure as described in Example 1. 4.55 g of magnesium hydroxide in a slurry was added to 800 g of the latex, by the procedure described in Example 2, to produce a latex containing 0.5 equivalents of magnesium. This post-treated latex was formulated into a coating composition as described in Example 1. The coating composition of Example 4 was tested for durability and resistance properties. The results are shown in Table V.

Example 5

The compositions of Examples 1–4 were tested for resistance properties and durability. The results, listed in TABLE V, show that coating compositions of the present invention having acetoacetate functionality and divalent metal ions have increased resistance to mar, scuff and black heel marks, compared to the same composition without divalent metal ions.

TABLE V

| Example | 1 (comparative) | 2 | 3 | 4 |
|---|---|---|---|---|
| Eqs. divalent metal | 0 | 0.5 Ca | 1.0 Ca | 0.5 Mg |
| VOC | 4 | 4 | 4 | 4 |
| Black heel mark resistance | 0.9 | 0.2 | 0.1 | 0.25 |
| Scuff resistance | 0.75 | 0.48 | 0.34 | 0.35 |
| Mar resistance | 4 | 2.5 | 2 2.5 | |

Example 6 (Comparative)

Examples 6–9 demonstrate the improvement in durability and resistance properties of the invention, using a polymer having a higher Tg than that of Examples 1–4. Example 6 is a comparative containing no divalent metal ions.

A polymer latex was prepared with the same procedure as described in Example 1 with a monomer composition of 18 BA/50 MMA/20 AAEM/12 MAA, yielding a measured polymer Tg of 80° C. This latex was formulated into the test composition as described in Example 1, except that 7 g of diethylene glycol ethyl ether was used. The coating composition of Example 6 was tested for durability and resistance properties. The results are shown in Table IX.

Example 7

The coating composition of Example 7 contains 0.5 equivalents of calcium. A polymer latex was prepared with the same procedure and composition as described in Example 6. 5.84 g of calcium hydroxide in a slurry was added to 800 g of the latex by the procedure described in Example 2. This latex was formulated into the same test composition as in Example 6. The coating composition of Example 7 was tested for durability and resistance properties. The results are shown in Table IX.

Example 8

The coating composition of Example 8 contains 1.0 equivalents of calcium. A polymer latex was prepared with the same procedure and composition as described in Example 6. 11.68 g of calcium hydroxide in a slurry was added to 800 g of the latex by the procedure described in Example 2. This latex was formulated into the same test composition as described in Example 6. The coating composition of Example 8 was tested for durability and resistance properties. The results are shown in Table IX.

Example 9

The compositions of Examples 6–8 were tested for resistance properties and durability. The results, listed in TABLE IX, show that coating compositions having acetoacetate functionality and divalent metal ions, using a polymer having a higher Tg than the polymer in Examples 1–4, have increased resistance to mar, scuff and black heel marks.

TABLE IX

| Example | 6 (comparative) | 7 | 8 |
|---|---|---|---|
| Eqs. divalent metal | 0 | 0.5 Ca | 1.0 Ca |
| VOC | 7 | 7 | 7 |
| Black heel mark resistance | 0.5 | 0.02 | 0 |
| Scuff resistance | 0.60 | 0.1 | 0.1 |
| Mar resistance | 3 | 2 | 1.5 |

Example 10 (Comparative)

Examples 10–12 demonstrate the improvement in durability and resistance properties of the invention using polymers with a lower level of acid-functional monomer than the previous examples. The coating composition of Example 10 is a comparative containing no divalent metal ion.

A polymer latex was prepared with the same procedure as described in Example 1 with a monomer composition of 57 BA/20 styrene (STY)/20 AAEM/3 MAA, yielding a polymer Tg of 39° C. This latex was formulated into the test composition as described in Example 1, except that 3 g of diethylene glycol ethyl ether were used. The coating composition of Example 10 was tested for durability and resistance properties. The results are shown in Table XII.

Example 11

Example 11 contains 1.0 equivalents of calcium. A polymer latex was prepared with the same procedure and composition as described in Example 10. 11.68 g of calcium hydroxide in a slurry was added to 800 g of the latex by the procedure described in Example 2. This latex was formulated into the same test composition as in Example 10. The coating composition of Example 11 was tested for durability and resistance properties. The results are shown in Table XII.

Example 12

The compositions of Examples 10 and 11 were tested for resistance properties and durability. The results, listed in TABLE XII, show that mar, scuff and black heel mark resistance is increased in coating compositions of this invention having acid-functional monomer levels of 3%.

TABLE XII

| Example | 6 (comparative) | 7 |
|---|---|---|
| Eqs. divalent metal | 0 | 1.0 Ca |
| VOC | 3 | 3 |
| Black heel mark resistance | 0.90 | 0.48 |
| Scuff resistance | 0.90 | 0.62 |
| Mar resistance | 4 | 3 |

Example 13 (Comparative)

Examples 13–15 demonstrate the improvement in durability and resistance properties of the invention, with acetoacetate functional polymers having no acid-functionality. Example 13 is a comparative containing no divalent metal ion.
Preparation of Latex Polymer 1422 g of DI water and 23.8 g of ammonium lauryl ether sulfate (59%) was charged to a kettle and heated to 83° C. A monomer emulsion mixture of 0.21 g ammonium lauryl ether sulfate (59%), 20.58 g of butyl acrylate, 32.93 g of methylmethacrylate, 82.5 g methacrylamide, 16.46 g acetoacetoxy ethyl methacrylate and 26.19 g of water was then added to the kettle, followed by 4.1 g of ammonium persulfate in 30 grams of water. After ten minutes, 4.95 g of sodium carbonate in 100 g of water was added and the kettle held for two minutes. A monomer emulsion mixture of 498.81 g water, 3.9 g of ammonium lauryl ether sulfate (59%), 391.92 g of butyl acrylate (BA), 313.53 g acetoacetoxy ethyl methacrylate (AAEM), 627.07 g of methylmethacrylate (MMA), 78.38 g methacrylamide (MAM) and 165 g of hydroxyethyl methacrylate (HEMA) was gradually added over 180 minutes with the kettle held at about 83° C. Following completion of the feed, the kettle was held at 83° C. for thirty minutes, 100 g of water added and the kettle cooled to 65° C. 10 g of iron (II) sulfate, 1 g of 70% t-butyl hydroperoxide dissolved in 12 g of water and 0.5 g of isoascorbic acid dissolved in 17 g of water were then added to the kettle. After 15 minutes, the kettle was cooled to 40° C. and diluted with 185 g of water. The latex contained a polymer of 25 BA/40 MMA/20 AAEM/10 HEMA/5 MAM with a Tg of 50° C. This latex was formulated into the test composition as described in Example 1, except that 7 g of diethylene glycol ethyl ether were used. The coating composition of Example 13 was tested for durability and resistance properties. The results are shown in Table XV.

Example 14

The composition of Example 14 contains 1.0 equivalents of calcium. A polymer latex was prepared with the same procedure and composition as described in Example 13. 11.68 g of calcium hydroxide in a slurry was added to 800 g of the latex by the procedure described in Example 2. This latex was formulated into the same test composition as described in Example 13. The coating composition of Example 14 was tested for durability and resistance properties. The results are shown in Table XV.

Example 15

The compositions of Examples 13 and 14 were tested for resistance properties and durability. The results, listed in TABLE XV, show that mar, scuff and black heel mark resistance is increased in coating compositions of this invention having acetoacetate functionality and divalent metal ions with polymers having no acid-functionality.

TABLE XV

| Example | 13 (comparative) | 14 |
|---|---|---|
| Eqs. divalent metal | 0 | 1.0 Ca |
| VOC | 7 | 7 |
| Black heel mark resistance | 0.48 | 0.27 |
| Scuff resistance | 0.55 | 0.27 |
| Mar resistance | 4 | 3 |

Example 16 (Comparative)

Examples 16–19 demonstrate the improvement in durability and resistance properties of the invention, using polymers containing two different levels of acetoacetate functionality. Example 16 is a comparative containing no acetoacetate functionality.

A polymer latex was prepared with the same procedure as described in Example 1 with a monomer composition of 36 BA/39 MMA/15 STY/10 MAA, yielding a polymer Tg of 59° C. 4.55 g of magnesium hydroxide in a slurry was added to 800 g of the latex, by the procedure described in Example 4, to produce a latex containing 0.5 equivalents of magnesium. This post-treated latex was formulated into the test composition as described in Example 1, except that 6.0 g of diethylene glycol ethyl ether was used. The coating composition of Example 16 was tested for durability and resistance properties. The results are shown in Table XIX.

Example 17

The coating composition of Example 17 has a polymer with 5% AAEM. A polymer latex was prepared with the same procedure as described in Example 1 with a monomer composition of 35 BA/23 MMA/5 AAEM/25 STY/12 MAA, yielding a polymer Tg of 57° C. 4.55 g of magnesium hydroxide in a slurry was added to 800 g of the latex, by the procedure described in Example 4, to produce a latex containing 0.5 equivalents of magnesium. This post-treated latex was formulated into the test composition as in Example 16. The coating composition of Example 17 was tested for durability and resistance properties. The results are shown in Table XIX.

Example 18

The coating composition of Example 18 has a polymer with 20% AAEM. A polymer latex was prepared with the same procedure as described in Example 1 with a monomer composition of 24 BA/43 MMA/20 AAEM/5 STY/8 MAA, yielding a polymer Tg of 58° C. 4.55 g of magnesium hydroxide in a slurry was added to 800 g of the latex, by the procedure described in Example 4, to produce a latex containing 0.5 equivalents of magnesium. This post-treated latex was formulated into the test composition as in Example 16. The coating composition of Example 18 was tested for durability and resistance properties. The results are shown in Table XIX.

Example 19

The compositions of Examples 16–18 were tested for resistance properties and durability. The results, listed in TABLE XIX, show improvement in resistance to mar, scuff and black heel marks when acetoacetate functionality is present in varying levels in the polymer and the polymer is post-treated with divalent metal ion.

TABLE XIX

| Example | 16 (comparative) | 17 | 18 |
| --- | --- | --- | --- |
| % AAEM | 0 | 5 | 20 |
| Eqs. divalent metal | 0.5 Mg | 0.5 Mg | 0.5 Mg |
| VOC | 6 | 6 | 6 |
| Black heel mark resistance | 0.62 | 0.5 | 0.36 |
| Scuff resistance | 0.58 | 0.4 | 0.2 |
| Mar resistance | 4 | 2 | 2 |

Example 20 (Comparative)

Examples 20–24 show the use of the present invention in pigmented coating compositions. Example 20 is a comparative having no divalent metal and no AAEM.

A 42.2% solids polymer latex was prepared with the same procedure as described in Example 14 with a monomer composition of 36 BA/39 MMA/15 STY/10 MAA, yielding a polymer Tg of 59° C. This latex was formulated into the following coating composition:

Latex Coating Composition Formulation

| Ingredient | Function | Weight (g) |
| --- | --- | --- |
| Pigment Grind | | |
| Water | diluent | 427.68 |
| Tamol 731A (Rohm and Haas, Co.) | dispersant | 69.96 |
| Triton CF-10 (Union Carbide) | surfactant | 11.88 |
| Tego Foamex 800 (Tego Chemie Service) | defoamer | 5.94 |
| Acrysol RM-2020 (Rohm and Haas Co.) | rheology modifier | 59.4 |
| Ti-Pure R-700 (DuPont Chemicals) | pigment | 1344.42 |

These components were mixed in a Cowles Dissolver for 25 minutes.

Post-Grind: Ingredients were added in order under agitation.

| Ingredient | Function | Weight (g) |
| --- | --- | --- |
| Pigment Grind (above) | | 320 |
| Deuteron MK (W.O.L. Schoner GmbH) | Flatting aid | 16 |
| TegoGlide 410 (Tego Chemie Service) | Slip aid | 1.2 |
| Aquacer 531 (Byk Cera b.v.) | Wax | 25.4 |

Coating Formulation: The amount of water was adjusted for constant solids level. The following is based on a 42.2% solids emulsion of Example 20.

| | |
| --- | --- |
| Post-Grind | 36.26 |
| Latex emulsion | 63.5 |
| water | 17.5 |
| butyl cellosolve (Union Carbide) | 5.8 |

The coating formulation of Example 20 was tested for durability and resistance properties. The results are shown in Table XXIV.

Example 21 (Comparative)

The coating composition of Example 21 contains divalent metal ions but no AAEM. A polymer latex was prepared with the same monomer composition and procedure as described in Example 20. 4.55 g of magnesium hydroxide in a slurry was added to 800 g of the latex by the procedure described in Example 4, to produce a latex containing 0.5 equivalents of magnesium. This post-treated latex was formulated into the coating composition as described in Example 20, using 65 g of the post-treated latex and 16 g of water. The coating composition of Example 21 was tested for durability and resistance properties. The results are shown in Table XXIV.

Example 22 (Comparative)

The coating composition of Example 22 contains AAEM but no divalent metal ions. A polymer latex was prepared with the same procedure as described in Example 1 with a monomer composition of 27 BA/36 MMA/20 AAEM/5 STY/12 MAA, yielding a calculated polymer Tg of 48° C. This latex was formulated into the test composition as described in Example 20 using 64 g of latex and 17 g of water. The coating composition of Example 22 was tested for durability and resistance properties. The results are shown in Table XXIV.

Example 23

The coating composition of Example 23 contains both AAEM and divalent metal ions. A polymer latex was prepared with the same procedure and composition as described in Example 22. 4.55 g of magnesium hydroxide in a slurry was added to 800 g of the latex, by the procedure described in Example 4, to produce a latex containing 0.5 equivalents of magnesium. This post-treated latex was formulated into the test composition as described in Example 20, using 66 g of post-treated latex and 15 g of water. The coating composition of Example 23 was tested for durability and resistance properties. The results are shown in Table XXIV.

Example 24

The compositions of Examples 20–23 were tested for resistance properties and durability. The results, listed in TABLE XXIV, show improvement in mar resistance, scuff resistance and black heel mark resistance in pigmented systems of this invention having acetoacetate functionality and divalent metal ions.

TABLE XXIV

| Example | 20 (comparative) | 21 (comparative) | 22 (comparative) | 23 |
|---|---|---|---|---|
| % AAEM | 0 | 0 | 20 | 20 |
| Eqs. divalent metal | 0 | 0.5 Mg | 0 | 0.5 Mg |
| VOC | 5 | 5 | 5 | 5 |
| Stackability | 2 | 3.5 | 3.5 | 4 |
| Mar resistance | 2.5 | 1.5 | 2 | 1 |

Example 25 (Comparative)

Examples 25–28 demonstrate the improvement in durability and resistance properties of the invention, using a polymer that is post treated with amino functional silane. Example 25 is a comparative containing no divalent metal ions and no amino functional silane.

A polymer latex was prepared with the same procedure and composition as described in Example 13 with a monomer composition of 25 BA/40 MMA/10 HEMA/20 AAEM/5 MAM, yielding a measured polymer Tg of 50° C. This latex was formulated into the test composition as described in Example 1, except that 6 g of diethylene glycol ethyl ether were used. The coating composition of Example 25 was tested for durability and resistance properties. The results are shown in Table XXIX.

Example 26 (Comparative)

The coating composition of Example 26 is a comparative having 0.5 equivalents of amino functional silane, but no divalent metal ion added to the acetoacetate functional polymer. A polymer latex was prepared with the same procedure and composition as described in Example 25. This latex was then post-reacted with amino-functional silane in the following manner:

Preparation of Silane-modified Polymer

The latex polymer was charged into a mixing vessel and polyoxyethylene (23) lauryl ether (Brij-35 (25%), ICI Americas, Inc.) was added with stirring at 3.3% based on polymer solids over 5 minutes. Approximately ten minutes later, the pH was adjusted to 7 with aqueous ammonia and aminoethyl aminopropyl trimethoxysilane was added dropwise over the course of about 5 minutes to produce a composition having 0.5 equivalents of aminosilane based for each equivalent of acetoacetate functionality. The mixture was allowed to stir for one hour, then to stand an additional sixteen hours before formulation into a coating composition. The silane-modified latex was formulated into the same test composition as in Example 25. The coating composition of Example 26 was tested for durability and resistance properties. The results are shown in Table XXIX.

Example 27

The coating composition of Example 27 contains 0.5 equivalents of calcium and no aminosilane. A polymer latex was prepared with the same procedure and composition as described in Example 25. 5.84 g of calcium hydroxide in a slurry was added to 800 g of the latex by the procedure described in Example 2. This latex was formulated into the same test composition as described in Example 25. The coating composition of Example 27 was tested for durability and resistance properties. The results are shown in Table XXIX.

Example 28

The coating composition of Example 28 contains 0.5 equivalents of calcium and 0.5 equivalents of aminosilane. A polymer latex was prepared with the same procedure and composition as described in Example 25. 5.84 g of calcium hydroxide in a slurry was added to 800 g of the latex by the procedure described in Example 2. Aminosilane was then added, as described in Example 26, to yield 0.5 equivalents of aminosilane for each equivalent of acetoacetate functionality. This latex was formulated into the same test composition as described in Example 25. The coating composition of Example 28 was tested for durability and resistance properties. The results are shown in Table XXIX.

Example 29

The compositions of Examples 25–28 were tested for resistance properties and durability. The results, listed in TABLE XXIX, show that coating compositions having acetoacetate functionality and divalent metal ions, with and without aminosilane, have increased resistance to mar, scuff and black heel marks.

TABLE XXIX

| Example | 25 (comparative) | 26 (comparative) | 27 | 28 |
|---|---|---|---|---|
| Eqs. Ca | 0 | 0 | 0.5 | 0.5 |
| Eqs. aminosilane | 0 | 0.5 | 0 | 0.5 |
| VOC | 6 | 6 | 6 | 6 |
| Black heel mark resistance | 0.5 | 0.35 | 0.27 | 0.12 |
| Scuff resistance | 0.58 | 0.48 | 0.48 | 0.42 |

Example 30 (Comparative)

Examples 30–32 demonstrate the improvement in durability and resistance properties using polymers of this invention having low levels of acid functionality and post-reacted with aminosilane. The coating composition of Example 30 is a comparative containing acetoacetate and acid functional polymer with no divalent metal ion and no aminosilane.

A polymer latex was prepared with the same procedure as described in Example 1 with a monomer composition of 40 BA/36 MMA/20 AAEM/4 MAA. This latex was formulated into the test composition as described in Example 1, except that 6 g of diethylene glycol ethyl ether were used. The coating composition of Example 30 was tested for durability and resistance properties. The results are shown in Table XXXII.

Example 31

Example 31 contains 0.5 equivalents of calcium and 0.5 equivalents of aminosilane with a polymer having acetoacetate functionality and 4 percent acid functionality. A polymer latex was prepared with the same procedure and composition as described in Example 30. 5.84 g of calcium hydroxide in a slurry was added to 800 g of the latex by the procedure described in Example 2. Aminosilane was then added using the procedure described in Example 26 to provide 0.5 equivalents of aminosilane for each equivalent of acetoacetate functionality. This latex was formulated into the same test composition as in Example 30. The coating composition of Example 31 was tested for durability and resistance properties. The results are shown in Table XXXII.

Example 32

The compositions of Examples 30 and 31 were tested for resistance properties and durability. The results, listed in TABLE XXXII, show that mar, scuff and black heel mark resistance is increased in coating compositions of this invention having low levels of acid-functionality.

TABLE XXXII

| Example | 30 (comparative) | 31 |
|---|---|---|
| Eqs. divalent metal | 0 | 0.5 Ca |
| VOC | 6 | 6 |
| Black heel mark resistance | 0.61 | 0.38 |
| Scuff resistance | 0.70 | 0.40 |

What is claimed is:

1. A coating composition comprising:
   a) polymer comprising, as polymerized units, from 0.5 percent to 97 percent by weight acetoacetate-functional monomer and from 3 percent to 50 percent by weight acid-functional monomer; wherein the polymer has a glass transition temperature in the range of from −20° C. to 150° C.;
   b) divalent metal ion selected from the group consisting of alkaline earth metals and mixtures thereof in the form of a metal oxide, tetra-amino metal bicarbonate complex, metal complex of an —NH— or NH$_2$— functional compound, or a metal salt, capable of reacting with the acetoacetate-functional polymer, provided the divalent metal ion is not zinc; and
   c) at least one wax emulsion selected from polyethylene, polypropylene and mixtures thereof;
   wherein the molar ratio of acetoacetate-functional monomer to divalent metal ion is in the range of from 20:1 to 2:1; wherein the composition is free of sulfopolyester; wherein the composition is free of amino-functional silane; and wherein the composition has a VOC level of from 0 to 5 percent by weight.

2. The coating composition of claim 1 wherein the level of acid-functional monomer in the polymer is below five percent by weight of the polymer.

3. A process comprising:
   a) forming a coating composition by admixing:
      1) polymer comprising, as polymerized units, from 0.5 percent to 97 percent by weight acetoacetate-functional monomer and from 3 percent to 50 percent by weight acid-functional monomer; wherein the polymer has a glass transition temperature in the range of from −20° C. to 150° C.;
      2) divalent metal ion selected from the group consisting of alkaline earth metals and mixtures thereof in the form of a metal oxide, tetra-amino metal bicarbonate complex, metal complex of an —NH— or NH$_2$— functional compound, or a metal salt, capable of reacting with the acetoacetate-functional polymer, provided the divalent metal ion is not zinc; and
      3) at least one wax emulsion selected from polyethylene, polypropylene and mixtures thereof;
      wherein the molar ratio of acetoacetate-functional monomer to divalent metal ion is in the range of from 20:1 to 2:1; wherein the composition is free of sulfopolyester; wherein the composition is free of amino-functional silane; and wherein the composition has a VOC level of from 0 to 5 percent by weight;
   b) applying said coating composition to a substrate to form a coated substrate; and
   c) drying said coated substrate.

4. The process of claim 3 wherein said coated substrate is dried under ambient conditions.

5. An article comprising a substrate coated with a coating composition; wherein said coating composition comprises:
   a) polymer comprising, as polymerized units, from 0.5 percent to 97 percent by weight acetoacetate-functional monomer and from 3 percent to 50 percent by weight acid-functional monomer; wherein the polymer has a glass transition temperature in the range of from −20° C. to 150° C.;
   b) divalent metal ion selected from the group consisting of alkaline earth metals and mixtures thereof in the form of a metal oxide, tetra-amino metal bicarbonate complex, metal complex of an —NH— or NH$_2$— functional compound, or a metal salt, capable of reacting with the acetoacetate-functional polymer, provided the divalent metal ion is not zinc; and
   c) at least one wax emulsion selected from the polyethylene, polypropylene and mixtures thereof;
   wherein the molar ratio of acetoacetate-functional monomer to divalent metal ion is in the range of from 20:1 to 2:1; wherein the composition is free of sulfopolyester; wherein the composition is free of amino-functional silane; and wherein the composition has a VOC level of from 0 to 5 percent by weight.

6. The coated article of claim 5 wherein the substrate it a flooring substrate selected from the group consisting of resilient flooring and non-resilient flooring.

7. The coated article of claim 5 wherein the substrate is selected from the group consisting of wood, particle board and medium density fiber board.

* * * * *

UNITED STATES PATENT AND TRADEMARK OFFICE
CERTIFICATE OF CORRECTION

PATENT NO.     : 6,586,516 B1
DATED          : July 1, 2003
INVENTOR(S)    : Kesselmayer et al.

It is certified that error appears in the above-identified patent and that said Letters Patent is hereby corrected as shown below:

Title page,
Item [*] Notice, delete "0" and insert -- 1110 --.

Signed and Sealed this

Twenty-eighth Day of September, 2004

JON W. DUDAS
*Director of the United States Patent and Trademark Office*